(12) United States Patent
Kawakatsu

(10) Patent No.: US 9,343,972 B2
(45) Date of Patent: May 17, 2016

(54) POWER SUPPLY SWITCHING RECTIFICATION METHOD ACCORDING TO INPUT ALTERNATING VOLTAGE, AND IMAGE FORMING APPARATUS HAVING THE SAME

(71) Applicant: CANON KABUSHIKI KAISHA, Tokyo (JP)

(72) Inventor: Jun Kawakatsu, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 13/712,453

(22) Filed: Dec. 12, 2012

(65) Prior Publication Data

US 2013/0156459 A1    Jun. 20, 2013

(30) Foreign Application Priority Data

Dec. 16, 2011    (JP) .................................. 2011-276255

(51) Int. Cl.
- *G03G 15/00*    (2006.01)
- *H02M 3/335*    (2006.01)
- *H02M 1/10*    (2006.01)

(52) U.S. Cl.
CPC ............ *H02M 3/33507* (2013.01); *H02M 1/10* (2013.01)

(58) Field of Classification Search
CPC . H02M 1/10; H02M 3/33507; H02M 3/3385; G03G 15/80
See application file for complete search history.

(56) References Cited

U.S. PATENT DOCUMENTS

| | | | | |
|---|---|---|---|---|
| 4,783,729 A * | 11/1988 | Konopka | ....................... | 363/143 |
| 4,805,083 A * | 2/1989 | Konopka | ....................... | 363/143 |
| 4,837,672 A * | 6/1989 | Donze | ........................... | 363/143 |
| 4,845,607 A * | 7/1989 | Nakao et al. | ................... | 363/49 |
| 4,937,731 A * | 6/1990 | Konopka | ....................... | 363/143 |
| 5,088,019 A * | 2/1992 | Williams et al. | ................ | 363/69 |
| 5,097,402 A * | 3/1992 | Kriz et al. | ....................... | 363/61 |
| 5,138,547 A * | 8/1992 | Swoboda | ....................... | 363/143 |
| 5,208,432 A * | 5/1993 | Han | .............................. | 219/716 |
| 6,147,882 A * | 11/2000 | Huber et al. | .................... | 363/39 |
| 6,154,380 A * | 11/2000 | Assow et al. | .................... | 363/61 |
| 6,236,584 B1 * | 5/2001 | Koo | .............................. | 363/143 |
| 6,449,180 B1 * | 9/2002 | Yang et al. | ..................... | 363/142 |
| 6,515,379 B1 * | 2/2003 | Nojima et al. | ................... | 307/64 |
| 2003/0099123 A1 * | 5/2003 | Odell | ............................ | 363/143 |

(Continued)

FOREIGN PATENT DOCUMENTS

| | | |
|---|---|---|
| JP | 2000-316280 A | 11/2000 |
| JP | 2004-187391 A | 7/2004 |

(Continued)

*Primary Examiner* — G. M. Hyder
(74) *Attorney, Agent, or Firm* — Canon USA, Inc., IP Division

(57) ABSTRACT

A power supply includes a rectification unit configured to be able to switch a rectification method between a voltage doubler rectification method and a full-wave rectification method according to an input alternating voltage, two capacitive elements serially connected between lines from the rectification unit, a monitoring unit configured to monitor a first voltage applied between the lines between which the two capacitive elements are connected and a second voltage applied across one of the capacitive elements that is connected to a lower potential side of the lines, and a switch configured to operate according to the second voltage, wherein the power supply interrupts the alternating voltage according to an operating state of the switch, the first voltage, and the second voltage.

14 Claims, 9 Drawing Sheets

(56) References Cited

U.S. PATENT DOCUMENTS

2006/0192774 A1* 8/2006 Yasumura ..................... 345/211
2011/0280597 A1* 11/2011 Shimura et al. ................ 399/37
2012/0155910 A1* 6/2012 Sato .............................. 399/88

FOREIGN PATENT DOCUMENTS

| JP | 2009-261077 A | 11/2009 |
| JP | 2010-093887 A | 4/2010 |
| JP | 2011-067037 A | 3/2011 |

* cited by examiner

US 9,343,972 B2

POWER SUPPLY SWITCHING RECTIFICATION METHOD ACCORDING TO INPUT ALTERNATING VOLTAGE, AND IMAGE FORMING APPARATUS HAVING THE SAME

BACKGROUND OF THE INVENTION

1. Field of the Invention

The present invention relates to a power supply having a function capable of switching between a full-wave rectification method and a voltage doubler rectification method according to an input voltage input from a commercial power supply.

2. Description of the Related Art

Japanese Patent Application Laid-Open No. 2000-316280 discusses a method for monitoring a voltage between a positive pole of an upper stage capacitor and a negative pole of a lower stage capacitor among two serially connected capacitors, as a configuration for protecting a smoothing capacitor provided to a power supply having a function capable of switching between a full-wave rectification method and a voltage doubler rectification method and a load connected to the power supply from an overvoltage. Further, Japanese Patent Application Laid-Open No. 2004-187391 discusses a configuration for monitoring an interterminal voltage of the upper stage capacitor and an interterminal voltage of the lower stage capacitor among the serially connected two capacitors, as a protecting configuration for protecting the capacitors from an overvoltage.

An example as discussed in Japanese Patent Application Laid-Open No. 2004-187391 for monitoring the interterminal voltage of the upper stage capacitor and the interterminal voltage of the lower stage capacitor among the serially connected two capacitors is described below with reference to FIG. 7. In such a power supply device, the full-wave rectification method and the voltage doubler rectification method are switched by a switch 3, and an alternating voltage input from a commercial power supply 1 is rectified by a bridge rectification circuit 2 (also referred to as diode bridge circuit). A general commercial power supply has two types such as a power supply of a 100V system for supplying about 100V and a power supply of a 200V system for supplying about 200V. In the former case, the switch 3 is turned on for the voltage doubler rectification and, whereas, in the letter case, the switch 3 is turned off for the full-wave rectification. Accordingly, smoothing capacitors 11 and 12 can be controlled such that the overvoltage is not applied to the smoothing capacitors 11 and 12.

Japanese Patent Application Laid-Open No. 2004-187391 also discusses a countermeasure against a case where the power supply of the 200V system is subjected to the voltage doubler rectification method. The countermeasure thereof is described below. In a case where a voltage between a positive pole of the smoothing capacitor 11 and a source of a field-effect transistor (FET) 13 excesses a predetermined threshold voltage, an interterminal voltage of a resistor 5 causes a shunt regulator 6 to turn on. After the shunt regulator 6 is turned on, transistors 8 and 7 are also turned on in this order. As a result thereof, a collector-emitter voltage of the transistor 7 drops and a gate-source voltage of the FET 13 drops below a gate threshold voltage, resulting in turning off of the FET 13. Accordingly, a current loop to the smoothing capacitor 11 is interrupted. A smoothing capacitor 12 can also be protected since the same protection circuit is provided to the smoothing capacitor 12 in a similar manner. More specifically, it is configured such that a voltage higher than a predetermined threshold is not applied to the smoothing capacitors 11 and 12 and a load 14, so that the smoothing capacitors 11 and 12 and the load 14 can be protected from an overvoltage.

However, in the conventional method for monitoring a voltage between the positive pole of the upper side capacitor and the negative pole of the lower side capacitor among the two serially connected capacitors 11 and 12, a countermeasure is not taken against the overvoltage applied to either one of the upper side capacitor or the lower side capacitor among the serially connected capacitors 11 and 12. On the other hand, with the method for monitoring an interterminal voltage of the upper stage capacitor and an interterminal voltage of the lower stage capacitor among the serially connected two capacitors 11 and 12, the countermeasure can be taken against the overvoltage applied to either one of the upper side capacitor and the lower side capacitor among the serially connected capacitors 11 and 12. However, a configuration in which a voltage applied to each of the two capacitors 11 and 12 is detected and a current loop to each capacitor is interrupted, as described above, raises the following problems.

The method requires two high breakdown voltage FETs and two high breakdown voltage transistors, resulting in inviting a high price.

The method requires the same two circuits in order to protect two capacitors 11 and 12, so that the method becomes expensive and the circuit size becomes larger.

SUMMARY OF THE INVENTION

The present invention is directed to a power supply capable of preventing serially connected capacitors from being applied with an overvoltage due to abnormality in switching a rectification method between a full-wave rectification method and a voltage doubler rectification method.

According to an aspect of the present invention, a power supply includes a rectification unit configured to be able to switch a rectification method between a voltage doubler rectification method and a full-wave rectification method according to an input alternating voltage, two capacitive elements serially connected between lines from the rectification unit, a monitoring unit configured to monitor a first voltage applied between the lines between which the two capacitive elements are connected and a second voltage applied across one of the capacitive elements that is connected to a lower potential side of the lines, and a switch configured to operate according to the second voltage, wherein the power supply interrupts the alternating voltage according to an operating state of the switch, the first voltage, and the second voltage.

According to another aspect of the present invention, an image forming apparatus includes an image forming unit configured to form an image, and a power supply configured to supply power to the image forming unit, wherein the power supply includes a rectification unit configured to be able to switch a rectification method between a voltage doubler rectification method and a full-wave rectification method according to an input alternating voltage, two capacitive elements serially connected between lines from the rectification unit, and a monitoring unit configured to monitor a first voltage applied between the lines between which the two capacitive elements are connected and a second voltage applied across one of the capacitive elements that is connected to a lower potential side of the lines, and a switch configured to operate according to the second voltage, wherein the power supply interrupts the alternating voltage according to an operating state of the switch, the first voltage, and the second voltage.

According to yet another aspect of the present invention, a power supply includes a rectification unit configured to be able to switch a rectification method between a voltage doubler rectification method and a full-wave rectification method according to an input alternating voltage, a switching unit configured to switch the rectification method of the rectification unit, two capacitive elements serially connected between output lines from the rectification unit, and a monitoring unit configured to monitor a first voltage applied between the output lines between which the two capacitive elements are connected and a second voltage applied across one of the capacitive elements that is connected to a lower potential side of the lines, wherein the power supply interrupts the alternating voltage according to a monitored result obtained by the monitoring unit.

According to yet another aspect of the present invention, an image forming apparatus includes an image forming unit configured to form an image, and a power supply configured to supply power to the image forming unit, wherein the power supply includes a rectification unit configured to be able to switch a rectification method between a voltage doubler rectification method and a full-wave rectification method according to an input alternating voltage, a switching unit configured to switch the rectification method of the rectification unit, two capacitive elements serially connected between output lines from the rectification unit, and a monitoring unit configured to monitor a first voltage applied between the output lines between which the two capacitive elements are connected and a second voltage applied across one of the capacitive elements that is connected to a lower potential side of the lines, wherein the power supply interrupts the alternating voltage according to a monitored result obtained by the monitoring unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
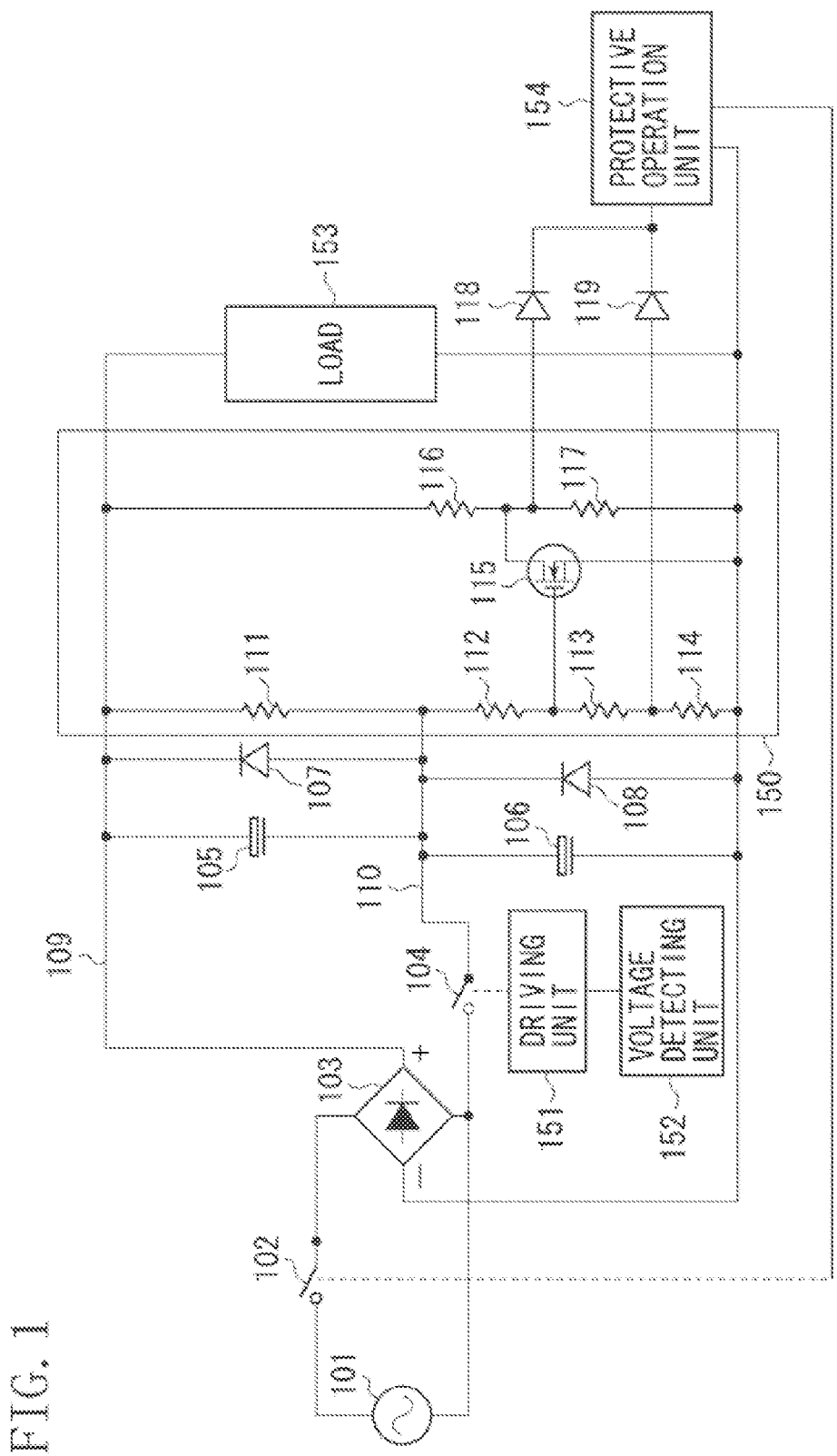
FIG. 1 is a schematic view of a configuration of a power supply according to a first exemplary embodiment.

FIG. 1 illustrates a configuration of a power supply circuit and a protection circuit for protecting against an overvoltage according to a first exemplary embodiment of the present invention. The circuit of the present exemplary embodiment is a power supply capable of switching a rectification method between the full-wave rectification method and the voltage doubler rectification method, wherein the alternating voltage input from a commercial power supply 101 is rectified by a bridge rectification circuit 103 via a switch 102 (e.g., a relay is used in the present exemplary embodiment). Smoothing capacitors 105 and 106 are serially connected to an output side of the bridge rectification circuit 103. Diodes 107 and 108 are connected in parallel with each corresponding smoothing capacitor. A middle point between the serially connected smoothing capacitors 105 and 106 is connected to one of input sides of the alternating voltage of the bridge rectification circuit 103 via a switch 104.

A voltage detecting unit 152 detects a power supply voltage and, in a case where the power supply is a 100V system, a driving unit 151 causes the switch 104 to be turned on for control according to the voltage doubler rectification method. In a case where the power supply is a 200V system, the driving unit 151 causes the switch 104 to be turned off for control according to the full-wave rectification method. An abnormality detecting unit 150 detects that an overvoltage is applied to the smoothing capacitors 105 and 106 and a load 153. The abnormality detecting unit 150 includes a first voltage monitoring unit and a second voltage monitoring unit, and has a function of monitoring two voltages. More specifically, the abnormality detecting unit 150 includes a first monitoring unit configured to monitor a voltage Vh (i.e., a first voltage) between a positive pole of the smoothing capacitor 105 and a negative pole of the smoothing capacitor 106 and a second monitoring unit configured to monitor a voltage Vm (i.e., a second voltage) across the smoothing capacitor 106 (i.e., between the positive pole and the negative pole of the smoothing capacitor 106). The abnormality detecting unit 150 is connected to the protective operation unit 154 via a diode 118 or a diode 119. The protective operation unit 154 turn on or off the switch 102 according to an input from the abnormality detecting unit 150.

An operation of the abnormality detecting unit 150 is described below with reference to FIG. 1. The voltage Vm is a resulting voltage divided by the resistors 112, 113, and 114. When the voltage Vm is higher than a threshold 3 (i.e., a third threshold), a field effect transistor (FET) 115 as a switching element is turned on. A resistor 111 is a balance resistor for adjusting a balance of voltages applied to the smoothing capacitors 105 and 106. A resistance value of the resistor 111 is set to a value approximately equivalent to the sum of values of the resistors 112, 113, and 114. Depending on an on-voltage of the FET 115 and an operating voltage of the protective operation unit 154, such a configuration may also be acceptable that the resistors 113 and 114 are replaced by a one resistor that is connected across a gate and a source of the FET 115 and a connection is also established from the gate of the FET 115 to an anode of the diode 119. The FET 115 may be replaced with a transistor. An interterminal voltage Vo1 of the resistor 114 is output to the protective operation unit 154 via the diode 119. An interterminal voltage Vo2 of a resistor 117 is output to the protective operation unit 154 via the diode 118. The voltage Vo2 is about 0V if the FET 115 is ON, whereas, if the FET 115 is OFF, the voltage Vo2 assumes a voltage value corresponding to a voltage drop across resistor 117 in accordance with the first voltage Vh being divided due to series connection of resistors 116 and 117. As described above, the third threshold is a threshold voltage usable to turn on the FET 115 of the abnormality detecting unit 150 to stop the output.

Figure 2:
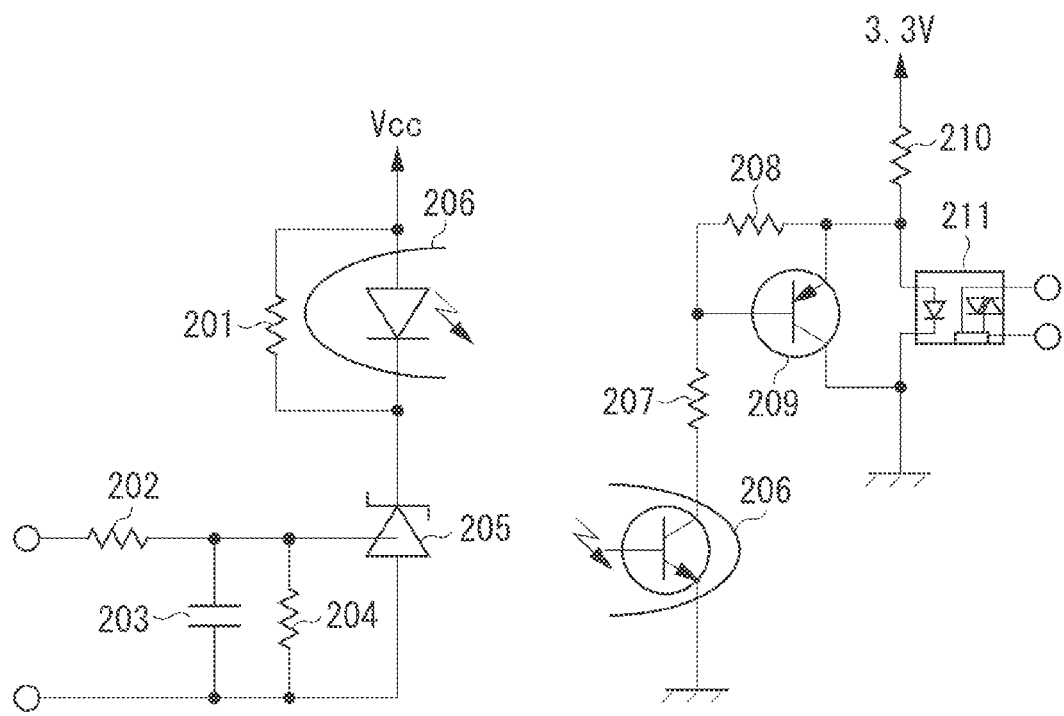
FIG. 2 is a circuit diagram of a protective operation unit according to the first exemplary embodiment.

FIG. 2 is a circuit diagram of the protective operation unit 154. An operation of the protective operation unit 154 is described below with reference to FIG. 2. In the protective operation unit 154, a higher one of the interterminal voltage Vo1 and the interterminal voltage Vo2 is input into a shunt regulator 205 via a low-pass filter, including resistors 202 and 204 and a capacitor 203, via the diode 118 or the diode 119. When an interterminal voltage of the resistor 204 as an input voltage input into the shunt regulator 205 exceeds an on-voltage of the shunt regulator 205, a photo coupler 206 emits light, and a light receiving side is turned on to cause a voltage 3.3V to be divided by resistors 207, 208, and 210. When an interterminal voltage of the resistor 208 exceeds an on-voltage of a transistor 209, a photo coupler 211 as the switch 102 is turned off. In FIG. 2, a direct-current (DC) power supply Vcc of about 15V is generated by an auxiliary winding of a transformer within a converter as a load 153. In FIG. 2, 3.3V represents a connection with a DC power supply of about 3.3V supplied from the other power supply (not illustrated).

Figures 3A, 3B, 3C:
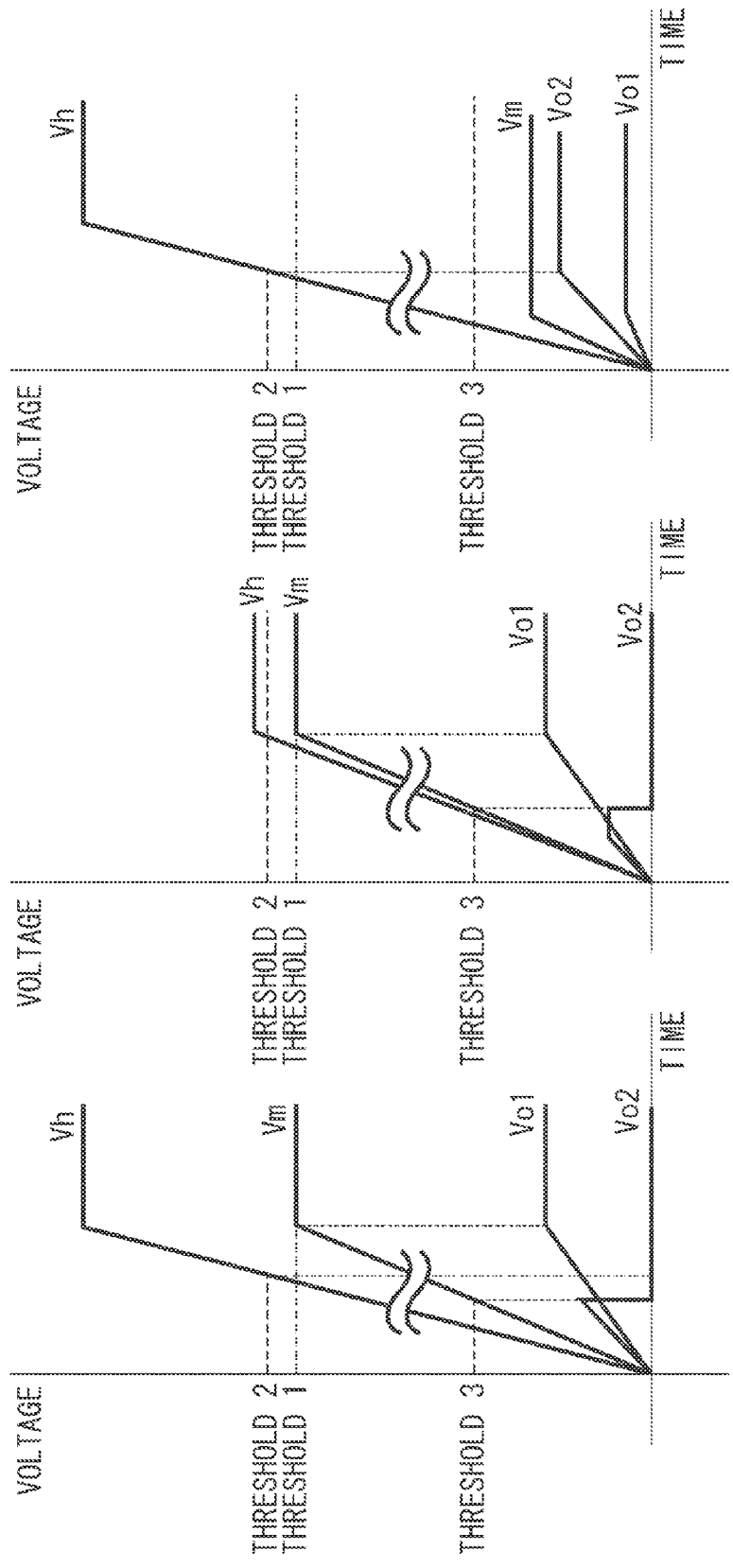
FIGS. 3A, 3B, and 3C illustrate a change of each voltage according to the first exemplary embodiment.

An operation in a case where an abnormal voltage is applied to the smoothing capacitors 105 and 106 and the load 153 is described below in detail with reference to an example of a case where, even though an input alternating voltage is a sinusoidal voltage of 200V, the switch 104 is turned on due to some abnormally and thus control is made by the voltage doubler rectification method. When the sinusoidal voltage of 200V is doubled, a half wave of the sinusoidal wave is applied to each of the smoothing capacitors 105 and 106. Each voltage at that time changes in a manner as illustrated in FIG. 3A.

When a voltage is applied from the commercial power supply 101, the other power supply (not illustrated) causes the switch 102 to turn on. A voltage Vh rises while keeping about a doubled-voltage of the voltage Vm. When the voltage Vm exceeds the threshold 3, a voltage obtained such that the voltage Vm is divided by using the resistors 112, 113, and 114 exceeds an on-voltage of the FET 115 to cause the FET 115 to turn on. When the FET 115 is turned on, the resistor 117 is essentially shorted out by the FET 115, so that the voltage Vo2 is fixed to almost 0V. Even in a case where the voltage Vh exceeds the threshold 2 (i.e., a second threshold), a setting is made such that the voltage Vh can exceed the threshold 2 only after the FET 115 is turned on. When the voltage Vm exceeds the threshold 1 (i.e., a first threshold), the interterminal voltage Vo1 causes the shunt regulator 205 to turn on a the low-pass filter, including the resistors 202 and 204 and the capacitor 203. Then, the photo coupler 206 emits light and the transistor 209 is turned on, whereas a photo coupler 211 as the switch 102 is turned off. When the switch 102 is turned off, a current loop to the smoothing capacitors 105 and 106 and the load 153 is interrupted, so that voltages Vm and Vh would no longer rise but gradually drops according to the load. Accordingly, the smoothing capacitors 105 and 106 and the load 153 can be protected from an overvoltage.

As described above, in a case where an abnormal voltage is applied across the serially connected two capacitors 105 and 106 or in a case where an abnormal voltage is applied to the lower side capacitor 106, the first threshold interrupts an input alternating voltage by using the switch 102. In a case where an abnormal voltage is applied to the upper side capacitor 105 of the serially connected two capacitors 105 and 106, the second threshold interrupts an input alternating voltage by using the switch 102.

An operation in a case where an abnormal voltage is applied to the smoothing capacitor 106 is described below in detail with reference to an example of a case where, even though a sinusoidal voltage is 200V, the switch 104 is brought into a state of a one-way short-circuit due to some abnormality is described below in detail. For example, in a case where the switch 104 is a photo coupler, the one-way short-circuit may occur. In a case where the switch 104 is shorted out in a direction from left to right in FIG. 1 but is open in a reverse direction thereof, each voltage changes in a manner as illustrated in FIG. 3B. The voltage Vm rises in a manner similar to the above described example. When the voltage Vm exceeds the threshold 3, a voltage obtained such that the voltage Vm is divided by using the resistors 112, 113, and 114 exceeds the on-voltage of the FET 115 to cause the FET 115 to turn on. When the FET 115 is turned on, since the resistor 117 is essentially shorted out by the FET 115, the voltage Vo2 is fixed to about 0V. Even when the voltage Vh exceeds the threshold 2, a setting is made such that the voltage Vh exceeds the threshold 2 only after the FET 115 is turned on. When the voltage Vm exceeds the threshold 1, the interterminal voltage Vo1 causes the shunt regulator 205 to turn on via the low-pass filter, including the resistors 202 and 204 and the capacitor 203. Then, the photo coupler 206 emits light and the transistor 209 is turned on, whereas the switch 102 is turned off. When the switch 102 is turned off, since a current loop to the smoothing capacitors 105 and 106 and the load 153 is interrupted, the voltages Vm and Vh would no longer rise but gradually drop according to the load. As a result thereof, the smoothing capacitors 105 and 106 and the load 153 can be protected from an overvoltage.

When the switch 104 is shorted out, different from the above example, in a direction from right to left in FIG. 1 and is open in the reverse direction thereof, each voltage changes in a manner as illustrated in FIG. 3C. The voltage Vm rises instantly but would not rise up to the threshold 3. The voltage Vh rises in a manner similar to that in the initial example, and when the voltage Vh exceeds the threshold 2, the voltage Vo2 obtained such that the voltage Vh is divided by using the resistors 116 and 117 causes the shunt regulator 205 to turn on via the low-pass filter, including the resistors 202 and 204 and the capacitor 203. Then, the photo coupler 206 emits light and the transistor 209 is turned on, whereas the switch 102 is turned off. When the switch 102 is turned off, a current loop to the smoothing capacitors 105 and 106 and the load 153 is interrupted. As a result thereof, the voltages Vm and Vh would no longer rise but gradually drop according to the load. Accordingly, the smoothing capacitors 105 and 106 and the load 153 can be protected from an overvoltage.

As described above, according to the present exemplary embodiment, the capacitors of the power supply can be protected from an overvoltage with a simple configuration requiring no increased circuit size.

Figure 4:
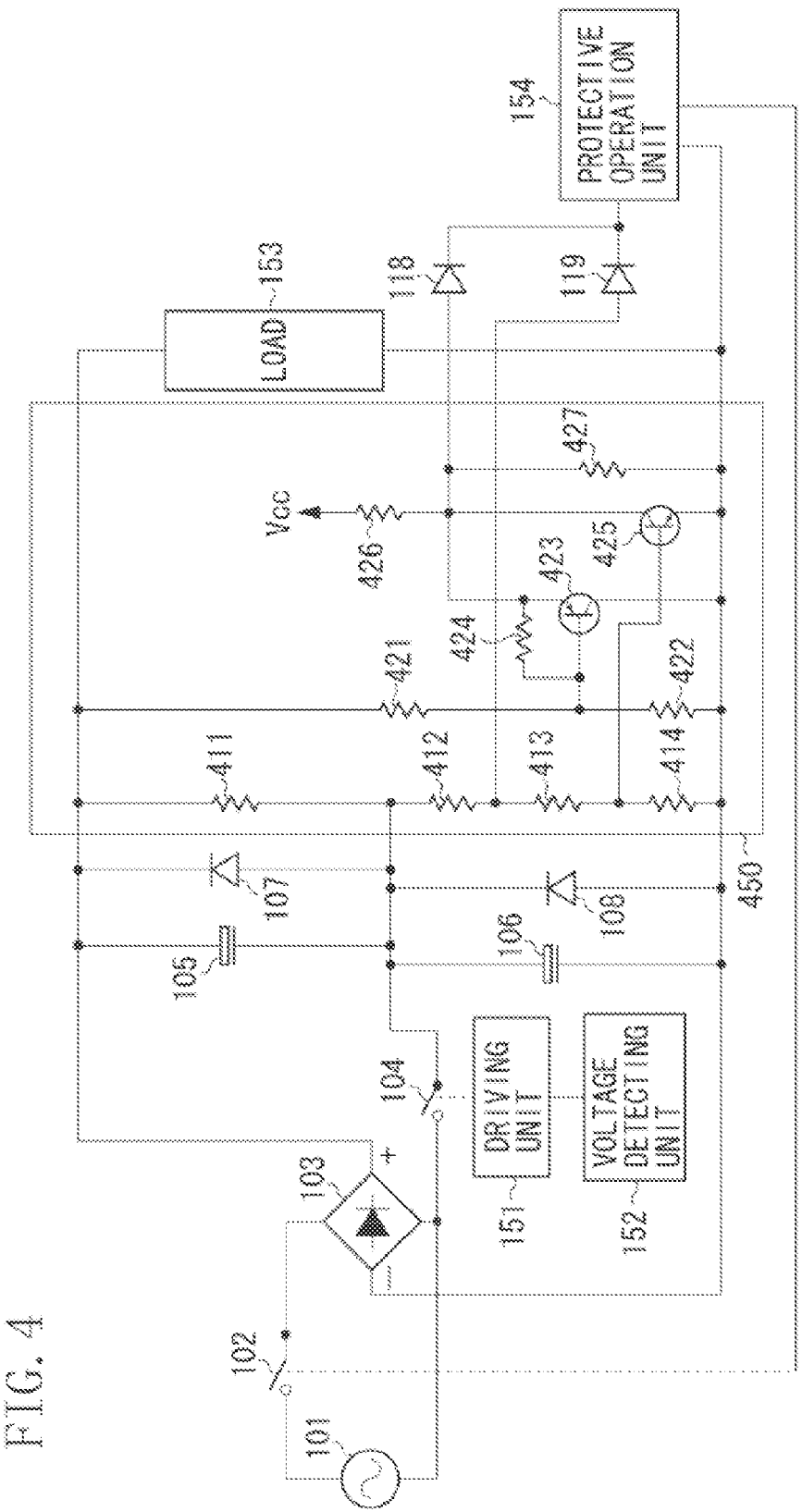
FIG. 4 is a schematic view of a configuration of a power supply according to a second exemplary embodiment.

FIG. 4 illustrates a configuration of a power supply and an abnormality detecting unit according to a second exemplary embodiment. Since a basic configuration of the power supply in the second exemplary embodiment is similar to that of the first exemplary embodiment, the description thereof is omitted here. The abnormality detecting unit 450 in the second exemplary embodiment is configured such that the interterminal voltage Vm of the smoothing capacitor 106 is divided by using the resistors 412, 413, and 414, and the line is connected from a middle point between the resistors 412 and 413 to the anode of the diode 119 and from a middle point between the resistors 413 and 414 to a base of the transistor 425. The resistor 411 is a balance resistor for adjusting a balance of the voltages applied to the smoothing capacitors 105 and 106 and a resistance value thereof is set to a value equivalent to the sum of the resistance values of the resistors 412, 413, and 414. The transistor 425 may be replaced with an FET. The voltage Vh between the positive pole of the upper side smoothing capacitor 105 and the negative pole of the lower side smoothing capacitor 106 is divided by using the resistors 421 and 422 and the line is connected to a base of the transistor 423 at a middle point between the resistors 421 and 422. An emitter of the transistor 423 and a collector of the transistor 425 are connected to a middle point at which the voltage Vcc is divided by using the resistors 426 and 427 and also connected to the anode of the diode 118. The voltage Vcc is a DC power supply of about 15V made of an auxiliary winding of a converter within the load 153 in a similar manner as the first exemplary embodiment.

Figure 5:
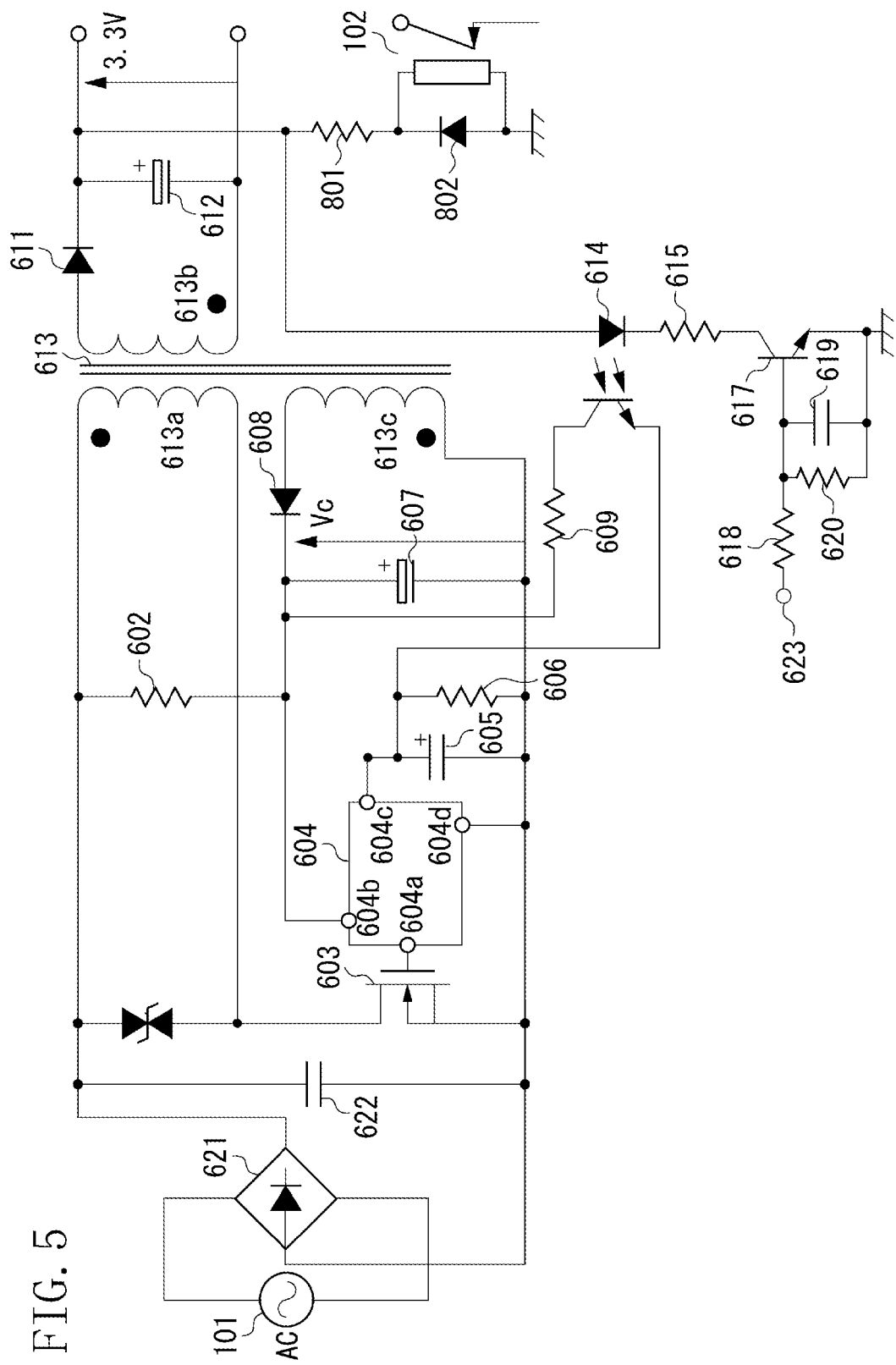
FIG. 5 is a circuit diagram of a protective operation unit according to the second exemplary embodiment.

FIG. 5 illustrates a protective operation unit 154 in the second exemplary embodiment, which is a power supply different from that illustrated in FIG. 4. A rectification circuit 621 is connected to the commercial power supply 101, and a capacitor 622 is charged with a voltage corresponding to a voltage input from the commercial power supply 101. The resistor 602 is connected to a terminal 604b of a power supply IC 604 through which current is supplied to drive the power supply IC 604. When the power supply IC 604 starts driving, a clock signal (CLK) is output from a terminal 604a to drive (i.e., to switch) an FET 603. With the switching operation, a voltage transformed by a transformer 613 is output to a secondary side. The voltage is rectified by a diode 611 and charged to a capacitor 612, thereby generating a DC power supply of 3.3V at the secondary side. With the switching operation, a voltage Vc rectified by a diode 608 is charged to a capacitor 607 also at a side of an auxiliary winding 613c. The power supply IC 604 continues driving owing to the power supply. The second exemplary embodiment is configured such that, when the driving of the power supply IC 604 is stopped, an output of the secondary side is stopped to switch off the switch 102. In a typical power supply, the protective operation unit is often provided in order to stop the power supply IC in a case where there is an abnormality in outputting of the secondary side. The use of the protective operation unit eliminates necessity to provide an additional protective operation unit for protecting the smoothing capacitors and the load in the present exemplary embodiment. Consequently, the power supply can be produced at low cost and formed into a small size.

Figure 6:
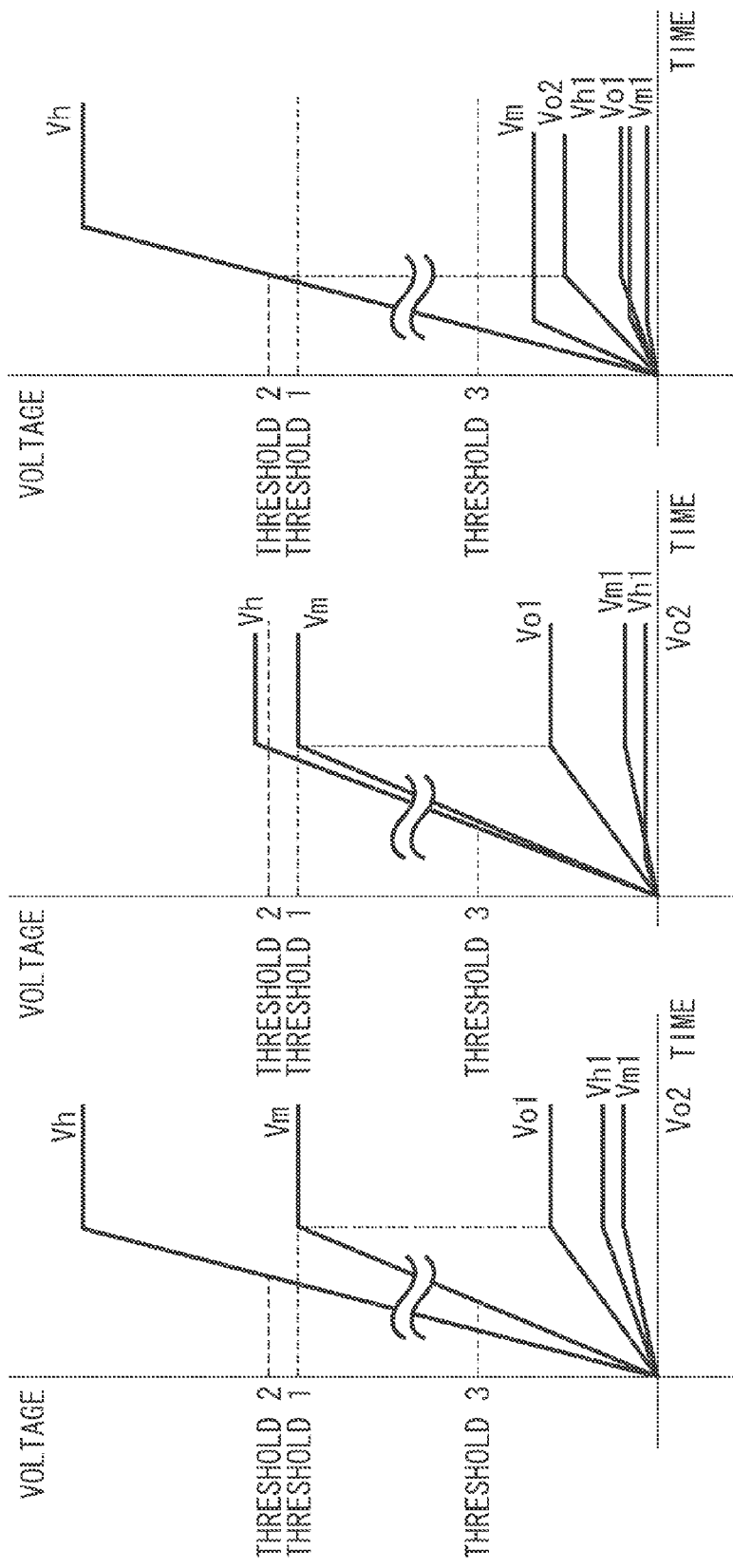
FIGS. 6A, 6B, and 6C illustrate a change of each voltage according to the second exemplary embodiment.
Figure 7:
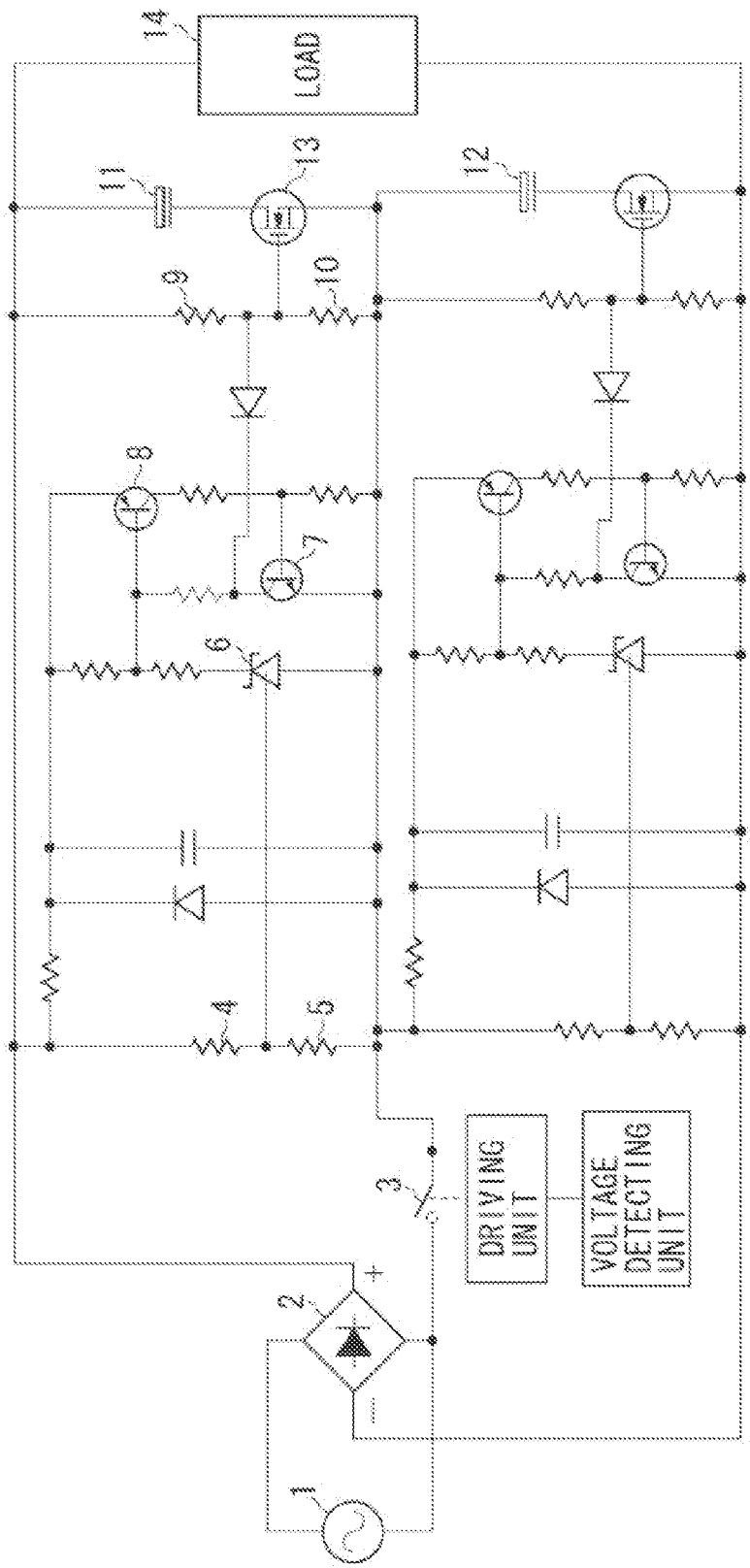
FIG. 7 illustrates a configuration of a conventional power supply.

An operation of a case where an abnormal voltage is applied to the smoothing capacitors 105 and 106 and the load 153 is described below in detail with reference to an example of a case where, even though an input voltage is a sinusoidal voltage of 200V, the switch 104 is turned on due to some abnormality and thus control is made according to the voltage doubler rectification method. When the sinusoidal voltage of 200V is doubled, a half wave of the sinusoidal wave is applied to each of the smoothing capacitors 105 and 106. Each voltage at that time changes in a manner as illustrated in FIG. 6A. The voltages Vm, Vh, Vo1, and Vo2 indicate the voltages of the corresponding portions as in the first exemplary embodiment. A voltage Vm1 is a base voltage of the transistor 425 and a voltage Vh1 is a base voltage of the transistor 423.

The voltage Vh rises while keeping a twice voltage of the voltage Vm. When the voltage Vm exceeds the threshold 3, the voltage Vm1 obtained such that the voltage Vm is divided by using the resistors 412, 413, and 414 exceeds an on-voltage of the transistor 425 and thus the transistor 425 is turned on. As a result thereof, a collector-emitter line of the transistor 425 is shorted out and the voltage Vo2 is fixed to about 0V. Even in a case where the voltage Vh exceeds the threshold 2, a setting is made such that the voltage Vh exceeds the threshold 2 only after the FET 115 is turned on. When the voltage Vm exceeds the threshold 1, the voltage Vo1 causes a transistor 617 to turn on via the low-pass filter, including the resistors 618 and 620 and the capacitor 619 in FIG. 5. Then, the photo coupler 614 emits light and a voltage obtained such that the voltage Vc is divided by using the resistors 609 and 606 is applied to the terminal 604c of the power supply IC 604. Accordingly, the clock signal (CLK) output from the terminal 604a is stopped and thus the switching of the FET 603 is stopped. As a result thereof, the power supply to the secondary side of the transformer 613 is stopped. When the power supply to the secondary side is stopped, the output voltage 3.3V drops, resulting in causing the switch 102 to turn off. When the switch 102 is turned off, a current loop to the smoothing capacitors 105 and 106 and the load 153 is interrupted, so that the voltages Vm and Vh would no longer rise but gradually drop according to the load. Accordingly, the smoothing capacitors 105 and 106 and the load 153 can be protected from an overvoltage.

An operation in a case where an abnormal voltage is applied to the smoothing capacitor 106 is described below in detail with reference to an example of a case where the switch 104 is shorted out in one direction due to some abnormality even when the sinusoidal voltage of 200V is input. For example, in a case where the switch 104 is a controlled type semiconductor switch, a one-way short-circuit can occur. In a case where the switch 104 is shorted out in a direction from left to right in FIG. 4 and is open in a direction right to left (i.e., in a reverse direction thereof) in FIG. 4, each voltage changes in a manner as illustrated in FIG. 6B. The voltage Vm rises in a manner similar to the above described example, and, when the voltage Vm exceeds the threshold 3, the voltage Vm1 obtained such that the Vm is divided by using the resistors 412, 413, and 414 exceeds an on-voltage of the transistor 425 to cause the transistor 425 to turn on. Consequently, a line between a collector and an emitter of the transistor 425 is shorted out. As a result thereof, the voltage Vo2 is fixed to about 0V. Even in a case where the voltage Vh exceeds the threshold 2, a setting is made such that the voltage Vh exceeds the threshold 2 only after the transistor 425 is turned on. When the voltage Vm exceeds the threshold 1, the voltage Vo1 causes the transistor 617 to turn on via a low-pass filter, including the resistors 618 and 620 and the capacitor 619 in FIG. 5. Then, the photo coupler 614 emits light and the voltage obtained such that the voltage Vc is divided by using the resistors 609 and 606 is applied to the terminal 604c of the power supply IC 604. Accordingly, the clock signal (CLK) output from the terminal 601a is stopped and the switching of the FET is stopped, thereby causing power supply to the secondary side of the transformer 613 to stop. When the power supply to the secondary side is stopped, the output voltage 3.3V drops to cause the relay 102 as the switch 102 to turn off. When the switch 102 is turned off, a current loop to the smoothing capacitors 105 and 106 and the load 153 is interrupted, so that the voltages Vm and Vh would no longer rise but gradually drop according to the load. Accordingly, the smoothing capacitors 105 and 106 and the load 153 are protected from an overvoltage.

In a case where the switch 104 is shorted out in a direction from right to left in FIG. 4, i.e., in a reverse direction different from the above described example, and is open in the reverse direction thereof, each voltage changes in a manner as illustrated in FIG. 6C. The voltage Vm instantly rises but does not reach the threshold 3, so that the transistor 425 cannot be turned on with a value of the voltage Vm1 but is put into an off state. The voltage Vh rises in a manner similar to the initial example and, when the voltage Vh exceeds the threshold 2, the voltage Vh1 obtained such that the voltage Vh is divided by using the resistors 421 and 422 causes the transistor 423 to turn off. Accordingly, the voltage Vo2 becomes a value obtained such that the voltage Vcc is divided by using the resistors 426 and 427 and causes the transistor 617 to turn on via a low-pass filter, including the resistors 618 and 620 and the capacitor 619 in FIG. 5. Then, the photo coupler 614 emits light and a voltage obtained such that the voltage Vc is divided by using the resistors 609 and 606 is applied to the terminal 604c of the power supply IC 604. Accordingly, the clock signal (CLK) output from the terminal 601a is stopped and the switching of the FET is stopped. As a result thereof, the power supply to the secondary side of the transformer 613 is stopped. When the power supply to the secondary side is stopped, the output voltage 3.3V drops to cause the relay 102 as the switch 102 to turn off. When the switch 102 is turned off, a current loop to the smoothing capacitors 105 and 106 and the load 153 is interrupted, so that the voltages Vm and Vh would no longer rise but gradually drop according to the load. Therefore, the smoothing capacitors 105 and 106 and the load 153 can be protected from an overvoltage.

According to the present exemplary embodiment, with a simple configuration requiring no increased circuit size, a capacitor of the power supply can be protected from an overvoltage.

According to the above described exemplary embodiments, the power supply capable of switching a rectification method between the full-wave rectification method and the voltage doubler rectification method can be applied to a power supply of an image forming apparatus such as a laser beam printer, a copying machine, and a facsimile machine. An application example thereof is described below. The power supply according to an exemplary embodiment of the present invention is applied to a power supply for supplying power to a controller as a control unit in the image forming apparatus or for supplying power to a motor as a driving unit of a conveyance roller for conveying a sheet as a recording material, and a power supply for supplying power to a fixing unit for fixing an image onto a sheet.

Figure 8A:
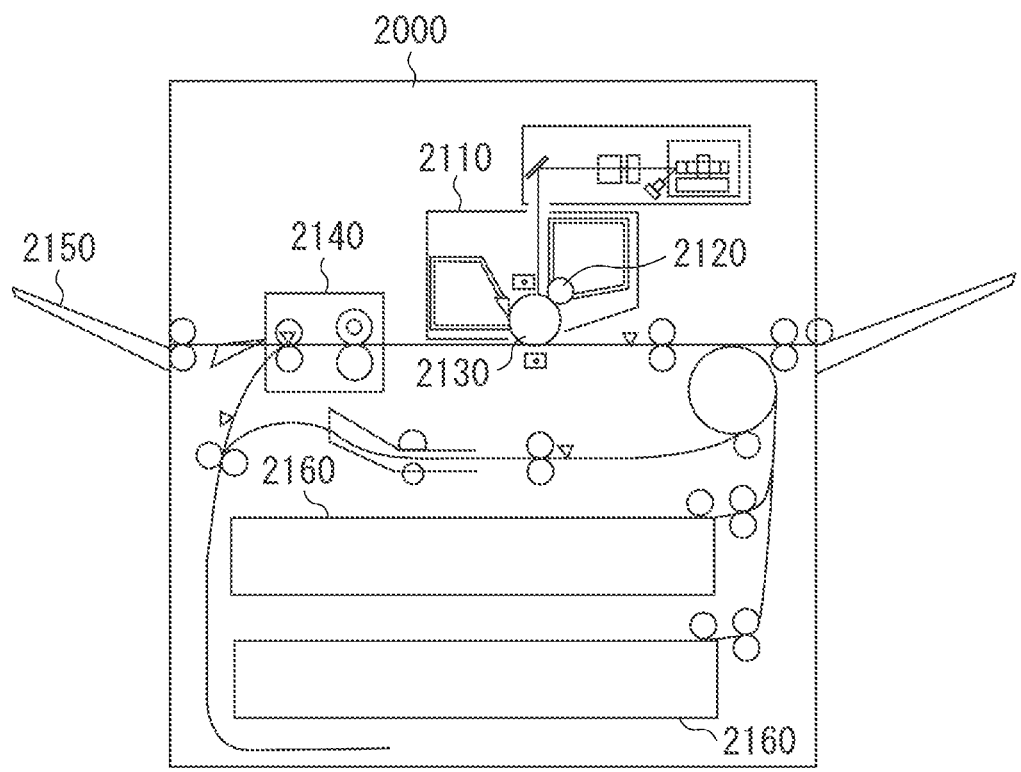
FIGS. 8A and 8B each illustrate an application example of the present invention.
Figure 8B:
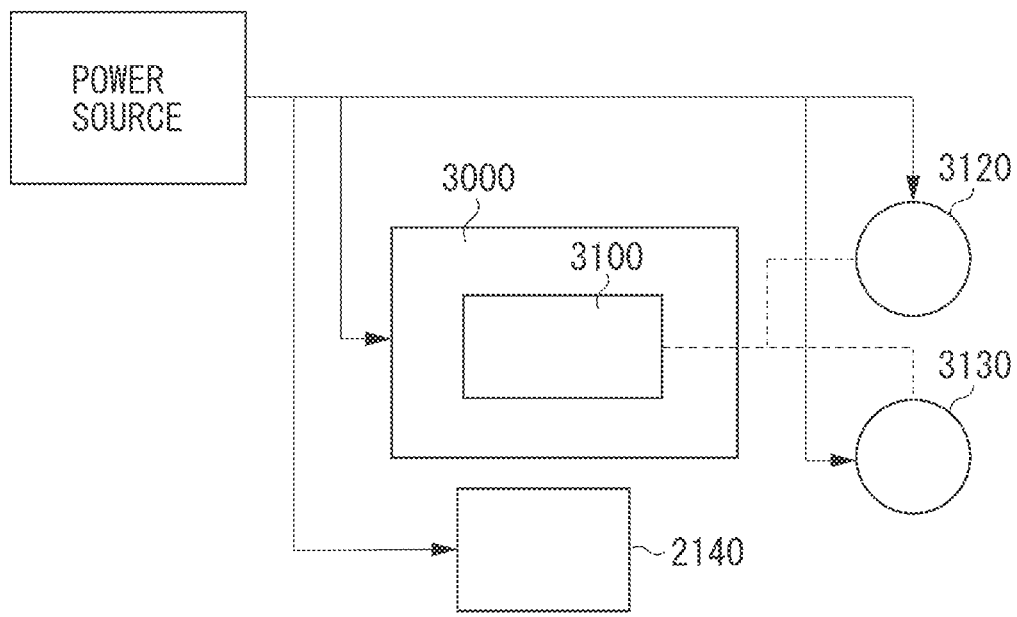

FIG. 8A illustrates a schematic configuration of a laser beam printer as an example of the image forming apparatus. A laser beam printer 2000 includes a photosensitive drum 2110 as an image bearing member on which a latent image is formed as an image forming unit 2100, and a development unit 2120 for developing the latent image formed on the photosensitive drum by using toner. The toner image developed on the photosensitive drum 2110 is transferred to a sheet (not illustrated) as a recording medium fed from a cassette 2160 to fix the toner image transferred to the sheet by a fixing unit 2140. Thereafter, the sheet is discharged to a tray 2150. FIG. 8B illustrates a controller as the control unit of the image forming apparatus and a power supply line from the power supply to a motor as the driving unit. The power supply according to an exemplary embodiment of the present invention can be applied to a power supply for supplying power to a controller 300 including the CPU 3100 for controlling such an image forming operation or for supplying power to a motor 3120 and a motor 3130 as driving units for image formation and for supplying power to a fixing unit 2140. As similar to the above described exemplary embodiments, with a simple configuration requiring no increased circuit size, the capacitor of the power supply can be protected from an overvoltage. The power supply described in the above exemplary embodiments is applicable to a power supply of an electronic apparatus other than an image forming apparatus as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-276255 filed Dec. 16, 2011, which is hereby incorporated by reference herein in its entirety.

What is claimed is:

1. A power supply, comprising:
 a rectification unit configured to rectify an alternating voltage input from a commercial alternating-current power supply;
 a first capacitor and a second capacitor connected in series between two lines at an output side of the rectification unit,
 wherein the second capacitor is connected to a lower potential side of the first capacitor;
 a first line configured to connect the commercial alternating-current power supply and the rectification unit;
 a first switch connected to the first line, the first switch is turned on or off;
 a second line configured to connect a midpoint of the first capacitor and the second capacitor, and the rectification unit;
 a second switch connected to the second line, the second switch is turned on or off,
 wherein the second switch is turned on in a case where the input alternating voltage is a first alternating voltage, and the second switch is turned off in a case where the alternating voltage is a second alternating voltage that is higher than the first alternating voltage;
 a detection unit configured to detect a voltage signal according to a voltage applied to the second capacitor that is connected to a lower potential side of the lines,
 wherein, in a case where the second alternating voltage is input to the rectification unit and the second switch is turned ON, a value of the voltage signal exceeds a first threshold,
 wherein the first switch is switched from ON to OFF in a case where the value of the voltage signal exceeds the first threshold.

2. The power supply according to claim 1, further comprising a second detection unit configured to detect a second voltage signal according to a voltage applied between the two lines at an output side of the rectification unit,
 wherein, in a case where the second alternating voltage is input to the rectification unit, the first switch is mswitched from ON to OFF in a case where a value of the second voltage signal exceeds a second threshold.

3. The power supply according to claim 2, wherein the value of the second voltage signal exceeds the second threshold in a case where an abnormality occurs in the second switch.

4. The power supply according to claim 3, wherein the second switch is a controlled type semiconductor switch, the abnormality includes one-way short-circuit.

5. The power supply according to claim 1, wherein the detection unit includes a plurality of resistor elements configured to divide the voltage applied to the second capacitor and a switch which turned on according to the divided voltage.

6. The power supply according to claim 1, wherein, in a case where an abnormality occurs in the second switch, the value of the voltage signal exceeds the first threshold.

7. The power supply according to claim 1, wherein the second switch is a controlled type semiconductor switch.

8. An image forming apparatus, comprising:
an image forming unit configured to form an image; and
a power supply configured to supply power to the image forming unit,
wherein the power supply comprises:
- a rectification unit configured to rectify an alternating voltage input from a commercial alternating-current power supply;
- a first capacitor and a second capacitor connected in series between two lines at an output side of the rectification unit,
 wherein the second capacitor is connected to a lower potential side of the first capacitor;
- a first line configured to connect the commercial alternating-current power supply and the rectification unit;
- a first switch connected to the first line, the first switch is turned on or off;
- a second line configured to connect a midpoint of the first capacitor and the second capacitor, and the rectification unit;
- a second switch connected to the second line, the second switch is turned on or off,
 wherein the second switch is turned on in a case where the input alternating voltage is a first alternating voltage, and the second switch is turned off in a case where the alternating voltage is a second alternating voltage that is higher than the first alternating voltage;
- a detection unit configured to detect a voltage signal according to a voltage applied to the second capacitor that is connected to a lower potential side of the lines, and
wherein, in a case where the second alternating voltage is input to the rectification unit and the second switch is turned ON, a value of the voltage signal exceeds a first threshold,
wherein the first switch is switched from ON to OFF in a case where the value of the voltage signal exceeds the first threshold.

9. The image forming apparatus according to claim 8, further comprising a second detection unit configured to detect a second voltage signal according to a voltage applied between the two lines at an output side of the rectification unit,
wherein, in a case where the second alternating voltage is input to the rectification unit, the first switch is switched from ON to OFF in a case where a value of the second voltage signal exceeds a second threshold.

10. The image forming apparatus according to claim 9, wherein the value of the second voltage signal exceeds the second threshold in a case where an abnormality occurs in the second switch.

11. The image forming apparatus according to claim 10, wherein the second switch is a controlled type semiconductor switch, the abnormality includes one-way short-circuit.

12. The image forming apparatus according to claim 8, wherein the detection unit includes a plurality of resistor elements configured to divide the voltage applied to the second capacitor and a switch which turned on according to the divided voltage.

13. The image forming apparatus according to claim 8, in a case where an abnormality occurs in the second switch, the value of the voltage signal exceeds the first threshold.

14. The image forming apparatus according to claim 8, wherein the second switch is a controlled type semiconductor switch.

* * * * *